United States Patent [19]
Lee

[11] Patent Number: 5,357,282
[45] Date of Patent: Oct. 18, 1994

[54] VIDEO DECODER WITH PARALLEL IMPLEMENTATION

[75] Inventor: Dong H. Lee, Seoul, Rep. of Korea

[73] Assignee: Goldstar Co., Ltd., Seoul, Rep. of Korea

[21] Appl. No.: 128,704

[22] Filed: Sep. 30, 1993

[30] Foreign Application Priority Data

Sep. 30, 1992 [KR] Rep. of Korea .................. 92-17866

[51] Int. Cl.[5] .......................................... H04N 7/13
[52] U.S. Cl. ................................. 348/403; 348/407
[58] Field of Search .................. 358/136, 135, 133; 348/402, 403, 407; H04N 7/13

[56] References Cited

U.S. PATENT DOCUMENTS

| | | | |
|---|---|---|---|
| 4,717,956 | 1/1988 | Moorhead et al. | 358/135 |
| 4,953,023 | 8/1990 | Kondo | 358/134 X |
| 5,012,337 | 4/1991 | Gillard | 358/136 |
| 5,132,792 | 7/1992 | Yonemitsu et al. | 358/136 |
| 5,134,477 | 7/1992 | Knauer et al. | 358/136 |
| 5,144,423 | 5/1992 | Knauer et al. | 348/402 |
| 5,157,742 | 10/1992 | Niihara | 358/136 X |

Primary Examiner—Victor R. Kostak
Attorney, Agent, or Firm—Jacobson, Price, Holman & Stern

[57] ABSTRACT

An image decoder for discrete cosine transform and motion compensation which separately performs a process for inverse quantization and inverse discrete cosine transform in the unit of 8×8 block and a process for motion compensation in the unit of 16×16 block and processes an image frame to be motion compensated by dividing the image frame into four phases and then compensates for the scanning difference between the respective processed video signals so as to be matched with each other. According to the present invention, real time processing of video signal with low speed clock frequency and stable motion compensation in the contour portion of subpictures are enabled, thereby improving picture quality.

9 Claims, 7 Drawing Sheets

VIDEO DECODER WITH PARALLEL IMPLEMENTATION

BACKGROUND OF THE INVENTION

1. Field of the Invention

The present invention relates to an image decoder for discrete cosine transform and motion compensation, and more particularly to an image decoder which separately performs a process for inverse quantization and inverse discrete cosine transform and a process for motion compensation with respective blocks and then compensates for the image data scanning difference generated during the respective processes, thereby enabling a stable motion compensation process in the contour portion of subpictures.

2. Description of the Prior Art

Generally, in an HDTV or MPEG standard image signal processing system, an image encoder or an image decoder for discrete cosine transform and motion compensation applied to image compression/expansion system requires a high clock frequency (above 50 MHz sampling clocks in case of HDTV) for real time processing of a video signal. Thus, a parallel processing method with division of the picture is applied in order to overcome the problem of hardware construction due to the real time processing of video signals with such a high clock frequency. That is, after a single picture to be signal-processed is divided into n subpictures, n image decoders are provided in parallel to individually perform a process for inverse quantization and inverse discrete cosine transform and a process for motion compensation on the respective subpictures. The expanded video signal can be obtained by adding the outputs of the respective decoders. As described above, the image decoders on n subpictures divide respective video signals, thereby reducing sampling clock frequency to 1/n and simply performing real time processing of video signal.

FIG. 1 is a schematic block diagram of a conventional image decoder, where the decoder processes a subpicture corresponding to 1/n of the overall picture. The decoder comprises a variable length decoder 1 for decoding the compressed video signal transmitted from image the encoder as a variable length code, an inverse quantization and inverse discrete cosine transform section 2 for restoring the video signal provided from variable length decoder 1, a frame memory 3 for storing the video signal in order to motion compensate for the signal, a motion compensating section 4 for performing motion compensation by reading out the video signal stored in frame memory 3, and an adder 5 for adding the inverse quantized and inverse discrete cosine transformed video signal to the motion compensated video signal. The image decoder takes one subpicture among n subpictures P1 to Pn divided from one frame shown in FIG. 2. That is, an image decoder on the overall picture is completed by providing n image decoders in FIG. 1 in parallel on n subpictures.

Operation of the above image decoder on one subpicture among n subpictures will be explained as follows.

Variable length decoder 1 decodes an input video signal and then provides the decoded signal to inverse quantization and inverse discrete transform section 2 which inverse quantizes and inverse discrete cosine transforms the decoded video signal and provides the inversely processed signal to adder 5. The video signal from adder 5 is stored in frame memory 3 and is read out by motion compensating section 4 and then is returned to adder 5 as a motion compensated video signal. Then, adder 5 adds the inverse quantized and inverse discrete cosine transformed video signal to the motion compensated video signal, thereby providing the final expanded video signal.

However, in the image decoder according to the division of picture, inverse quantization and inverse discrete cosine transform are processed easily but there may be a problem in processing motion compensation. That is, if information on motion vector MV crosses the contour portions of subpicture Pn as shown in FIG. 3, each decoder cannot be independently parallel-processed on respective subpictures. Accordingly, separate control logic circuits and memories for motion compensation in contour portions of subpictures are required. Thus the effect of a parallel processing method for real time processing with a low speed clock is reduced. Also, information on motion compensation which crosses the contour portions of subpictures causes image processing with a low frequency to be unstable so that the picture quality deteriorates.

SUMMARY OF THE INVENTION

The present invention has been made to overcome the problems involved in the prior art.

It is an object of the present invention to provide an image decoder that processes an image frame divided into four phases to be motion compensated and matches the orders of the video signals having the scanning difference between themselves on respective phases, thereby enabling stable motion compensation processing in the contour portion of subpicture and real time processing of video signals with a low speed clock frequency and improving the picture quality.

In order to achieve the above object, there is provided an image decoder comprising:

a demultiplexer for dividing a video signal for a frame into four phases respectively comprising an 8×8 block;

a plurality of inverse quantization and inverse discrete cosine transform means for respectively inverse quantizing and inverse discrete cosine transforming the divided video signals of the 8×8 block;

phase compensating means for matching each of the phases of respective motion compensated video signals;

scanning conversion means for matching respective scanning orders of the inverse quantized and inverse discrete cosine transformed video signals and the motion compensated video signal;

an adder for adding the scanning converted video signal to the motion compensated video signal from the phase compensating means;

phase dividing means for dividing the video signal for a frame from the adder into four phases on the X axis;

data switching means for controlling the orders of reading and writing timings of the video signals to be provided to the phase compensating means and the video signals provided from the phase dividing means;

a plurality of pairs of frame memories for alternately reading and writing the respective video signals from the data switching means on four phases;

address switching means for controlling the orders of the read and write addresses of the plurality of pairs of frame memories so as to be alternately provided; and address generating means for generating the read and write addresses of the plurality of pairs of frame memories through the address switching means.

BRIEF DESCRIPTION OF THE DRAWINGS

The above object and other advantages of the present invention will become more apparent by describing the preferred embodiment thereof with reference to the accompanying drawings, in which.

DETAILED DESCRIPTION OF PREFERRED EMBODIMENTS

Figure 1:
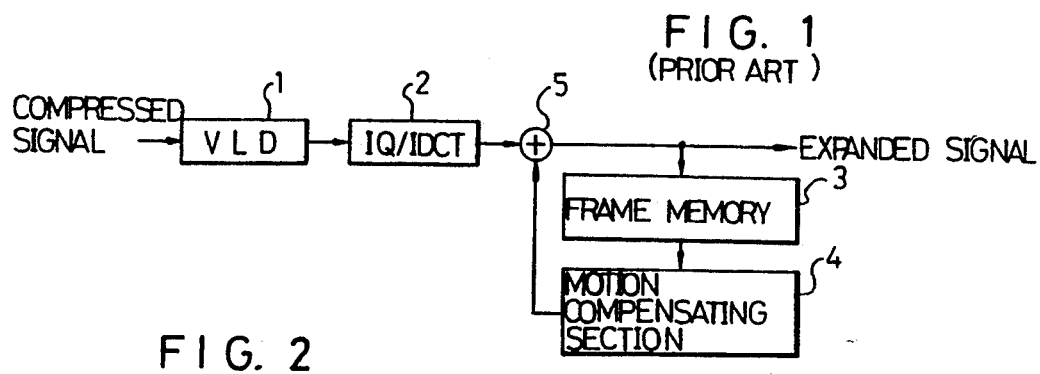
FIG. 1 is a schematic block diagram of a conventional image decoder for discrete cosine transform and motion compensation.
Figure 2:
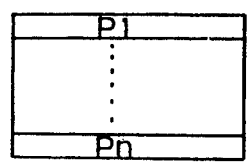
FIG. 2 shows a divided state of subpicture applied to the parallel processing method according to the conventional division of picture.
Figure 3:
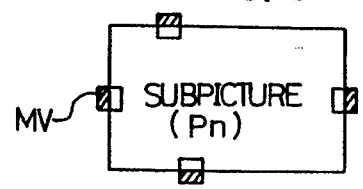
FIG. 3 shows a state of subpicture for explaining a case in that information on motion compensation crosses the contour portions of subpicture in a conventional image decoder.
Figure 4:
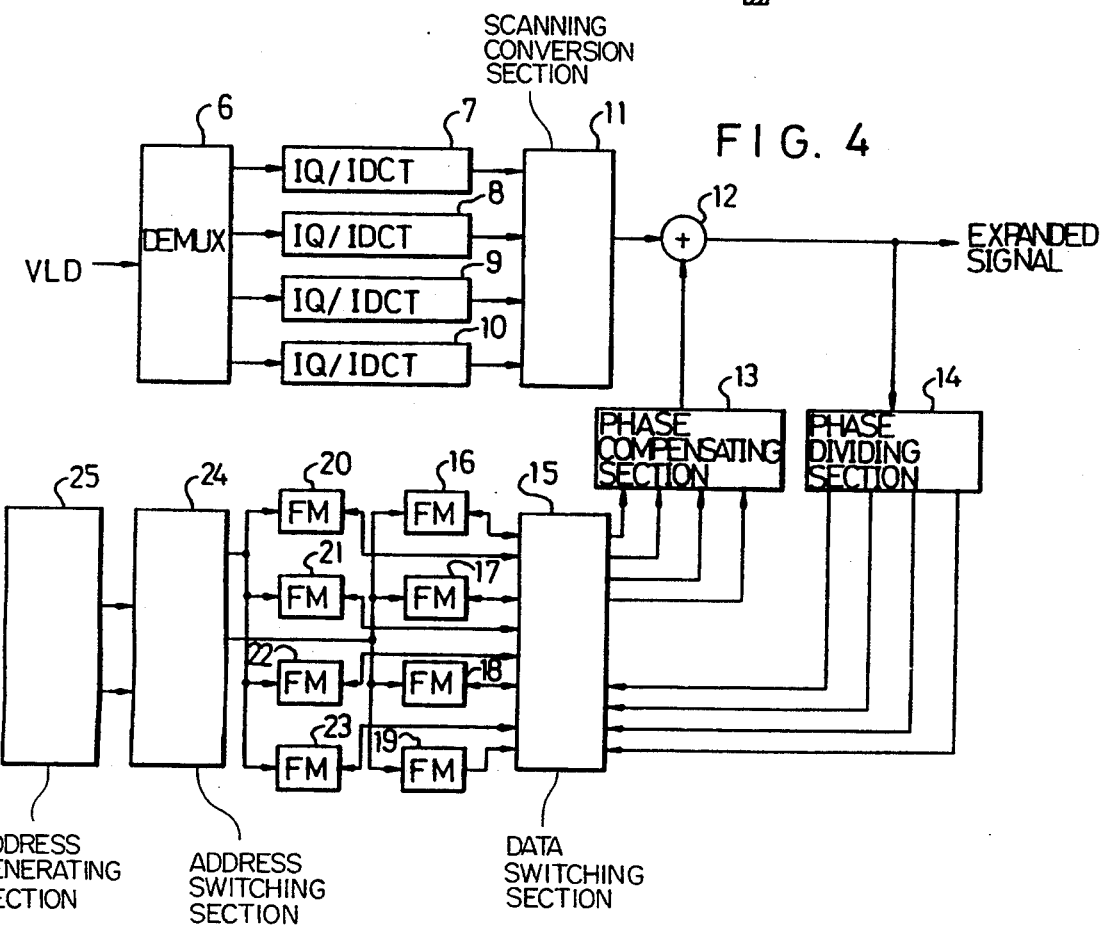
FIG. 4 is a block diagram of one embodiment of the image decoder according to the present invention.

Referring to FIG. 4 showing one embodiment of the present invention, the image decoder comprises a demultiplexer 6 for dividing a video signal for a frame into four phases of an 8×8 block, inverse quantization and inverse discrete cosine transform sections 7 to 10 for respectively inverse quantizing and inverse discrete cosine transforming the divided video signals of 8×8 block, and a scanning conversion section 11 for matching the scanning orders of the inverse quantized and inverse discrete cosine transformed video signals and the motion compensated video signal. The image decoder also includes an adder 12 for adding the scanning converted video signal to the motion compensated video signal from phase compensating section 13, a phase compensating section 13 for matching the phases of the respective motion compensated video signals to be provided to adder 12, and a phase dividing section 14 for dividing the video signal from adder 12 for one frame into four phases on the X axis. In this embodiment, a data switching section 15 for controlling the orders of reading and writing timings of the video signals to be provided to phase compensating section 13 and the video signals provided from phase dividing section 14, frame memories 16 to 23 for alternately reading and writing the respective video signals on four phases, address switching section 24 for controlling the orders of the read and write addresses of frame memories 16 to 23 so as to be alternately provided, and address generating section 25 for generating the read and write addresses of frame memories 16 to 23 through address switching section 24 are also provided.

In this embodiment of the image decoder according to the present invention constructed as above, a process for inverse quantization and inverse discrete cosine transform is performed in the unit of 8×8 block and processing for motion compensation is performed in the unit of 16×16 block. At this time, such units are varied according to the required image compression/expansion system and thus the units are not limited to the above mentiond 8×8 and 16×16 blocks. According to the above described image decoder, the processing structure for motion compensation is different from that for inverse quantization and inverse discrete cosine transform.

Figure 5A:
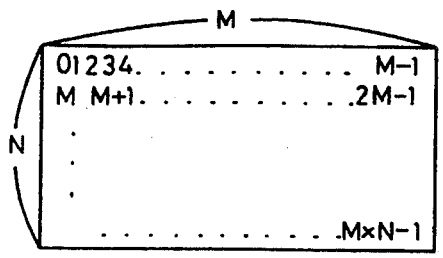
FIGS. 5A and 5B show image constitutions of a frame memory according to the present invention.
Figure 5B:
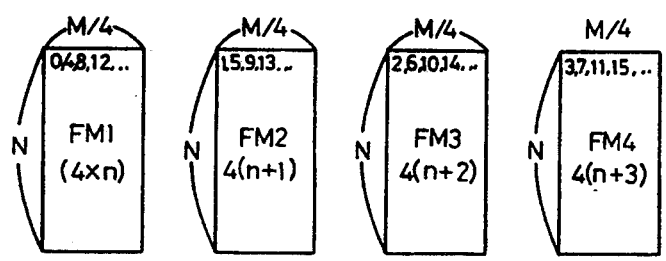

That is, for motion compensation, a video signal for one frame (M×N) as shown in FIG. 5A is parallel-processed by being divided into four phases on the X axis as shown in FIG. 5B. Each of the pixel values respectively corresponding to 4·n (n:0 to M×N−1), 4(n+1), 4(n+2), and 4(n+3) is respectively assigned to frame images FM1 to FM4.

Frame image FM1 on the first phase, frame image FM2 on the second phase, frame image FM3 on the third phase, and frame image FM4 on the fourth phase respectively correspond to each pair of frame memories 16 and 20, 17 and 21, 18 and 22, and 19 and 23.

That is, frame memories 16 to 19 and frame memories 20 to 23 respectively read or write video signals for one frame divided into four phases. When frame memories 16 to 19 write frame images FM1 to FM4, frame memories 20 to 23 read frame images FM1 to FM4 previously stored therein. And then, the reading and writing operations of each pair of memories are alternately changed with respect to themselves. Accordingly, because the video signals of the 16×16 block to be motion compensated are divided into the same data of 4×16 block on respective four phases, the motion compensated image signal corresponding to 16×16 block can be obtained by reading out the image signals on the four phases at the same time (that is, reading out the image signals of frame memories 16 to 23 at the same time).

Figure 6A:
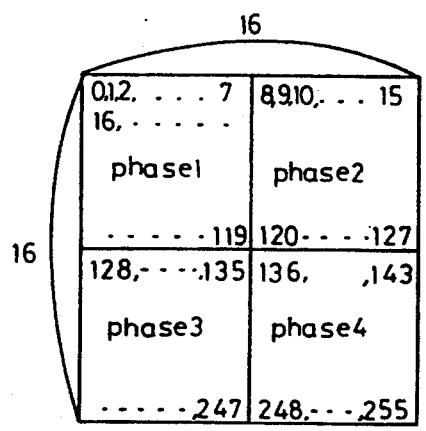
FIGS. 6A to 6D show image constitutions explaining the scanning order of video signal by each portion of FIG. 4.
Figure 6B:
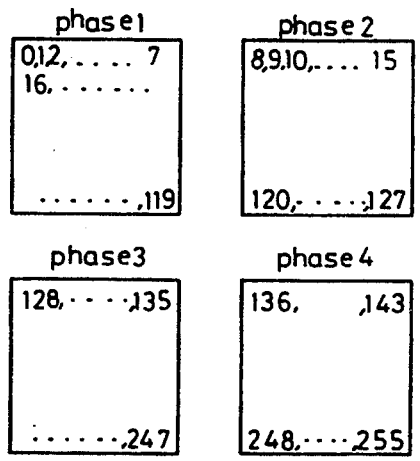

Meanwhile, for inverse quantization and inverse discrete cosine transform, a video signal of 16×16 block as shown in FIG. 6A is divided into four phases, phase 1 to phase 4, of 8×8 block as shown in FIG. 6B. A video signal decoded by variable length decoder enters demultiplexer 6 as shown in FIG. 6A and is divided into four phases and then is provided to corresponding inverse quantization and inverse discrete cosine transform sections 7 to 10. The respective inverse quantized and inverse discrete cosine transformed video signals from respective inverse quantization and inverse discrete cosine transform sections 7 to 10 are scanned according to the order of FIG. 6B and then are provided to scanning conversion section 11.

Meanwhile, the video signal for one frame of 16×16 block from adder 12 is divided into four phases of 4×16 block on the X axis by phase dividing section 14. Frame memories 16 to 19 write the divided video signals for each phase under the control of data switching section 15 and simultaneously frame memories 20 to 23 read the video signals of the previous frame stored therein for each phase and provide the read signals to phase compensating section 13.

Subsequently, in the next image signal process timing, data switching section 15 stores the video signals from phase dividing section 14 in frame memories 20 to 23 for each phase and reads the video signals of the previous frame stored in frame memories 16 to 19 so as to provide the read signals to phase compensating section 13. Such an operation is alternately performed in the unit of frame.

Figure 6C:
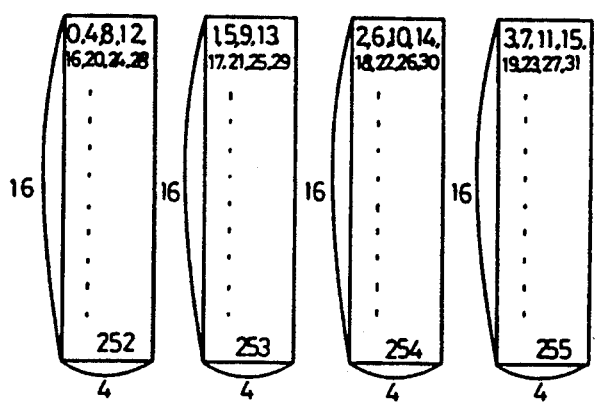

As described above, the video signals alternately read out from frame memories 16 to 19 or frame memories 20 to 23 are scanned according to the order of the signals divided into four phases of $4 \times 16$ block on the X axis as shown in FIG. 6C and then are provided to phase compensating section 13.

Meanwhile, read address RD and write address WR of frame memories 16 to 23 are provided from address generating section 25 and respective timings thereof are converted by address switching section 24 in the unit of frame and then the addresses are alternately provided to each of frame memories 16 to 19 and 20 to 23. Accordingly, frame memories 16 to 23 read or write video signals alternately.

Figure 6D:
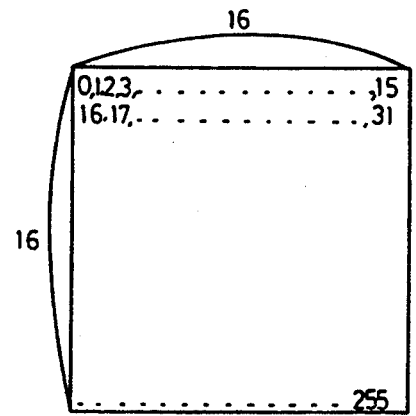

The video signal provided to phase compensating section 13 according to the scanning order as shown in FIG. 6C as stated above is scanned like that of FIG. 6D and then is provided to adder 12. Accordingly, there is a great scanning difference between the video signals from inverse quantization and inverse discrete cosine transform sections 7 to 10 scanned like that of FIG. 6B and the video signal from phase compensating section 13 scanned like that of FIG. 6D, where the scanning difference is compensated for by scanning conversion section 11. That is, scanning conversion section 11 matches the scanning order of the video signal from inverse quantization and inverse discrete cosine transform sections 7 to 10 to adder 12 so as to be in accord with the scanning order of the video signal from phase compensating section 13 to adder 12.

Figure 7:
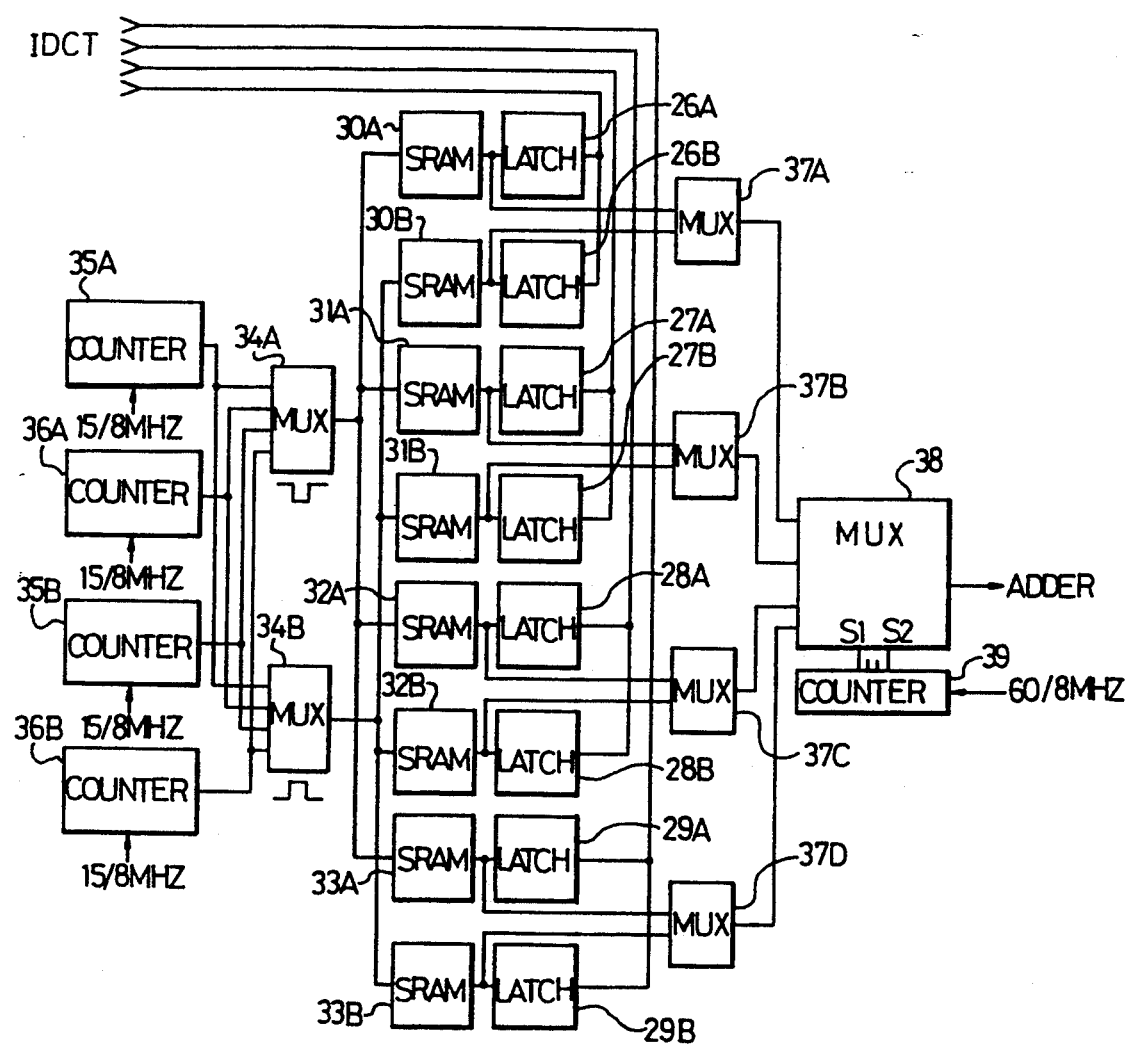
FIG. 7 is an embodied circuit diagram of one embodiment of the scanning conversion section in the image decoder according to the present invention.

As shown in FIG. 7, scanning conversion section 11 of one embodiment according to the present invention comprises tri-state latches 26A to 29B for controlling reading and writing timings of the video signals divided into four phases of $8 \times 8$ block in the unit of frame, four pairs of SRAMs (Static Random Access Memories) 30A to 33B for alternately reading and writing the video signals of $8 \times 8$ block under the control of respective latches 26A to 29B, multiplexers 34A and 34B for alternately providing the read and write addresses of SRAMs 30A to 33B, counters 35A to 36B for providing the read and write addresses of SRAMs 30A to 33B to multiplexers 34A and 34B, multiplexers 37A to 37D for alternately providing the video signals from respective pairs of SRAMs 30A to 33B, a multiplexer 38 for multiplexing the outputs of multiplexers 37A to 37D according to the order of motion compensated video signal, and a counter 39 for providing selection control signals to multiplexer 38.

Operation of scanning conversion section 11 constructed as above will be described as follows.

The inverse discrete cosine transformed video signals as shown in FIG. 6B enter tri-state latches 26A to 29B for each frame. First to fourth phases phase 1 to phase 4 are respectively supplied to each pair of tri-state latches 26A and 26B, 27A and 27B, 28A and 28B, and 29A and 29B.

Tri-state latches 26A and 26B are alternately enabled. For example, if tri-state latch 26A is 'on', tri-state latch 26B becomes high impedance state, and if tri-state latch 26B is 'on', tri-state latch 26A becomes high impedance state. This operation is converted for each frame.

Accordingly, if tri-state latch 26A is 'on', the video signal of the first phase is written on SRAM 30A and simultaneously the video signal of SRAM 30B is read out and thus is outputted through multiplexer 37A. And, if tri-state latch 26B is 'on', the video signal of the first phase is written on SRAM 30B and simultaneously the video signal of SRAM 30A is read out and thus is outputted through multiplexer 37B. This operation is similarly performed with respect to the other pairs of tri-state latches 27A to 29B on second to fourth phases. That is, two memories and two SRAMs for alternately reading and writing video signals for each frame are assigned and thus the reading and writing operations of video signals are converted in the unit of frame. The read and write addresses of SRAMs 30A to 33B from counters 35A to 36B are converted by multiplexers 34A and 34B for each data period of $8 \times 8$ block.

If a sampling frequency of image data is 60 MHz, each data clock of respective phases divided in four may be reduced to be 15 MHz.

The address of SRAM has a two-dimensional structure of assigning X axis by three lower bits and assigning Y axis by three upper bits on the basis of $8 \times 8 = 64 = 2^6$ (pixels). In accordance with the structure, the read and write addresses are divided along the X axis and Y axis. Counters 35A, 36A, 35B, and 36B respectively correspond to a Y axis address counter with a clock of 15/8 MHz, an X axis write counter with a clock of 15 MHz, a Y axis read counter with a clock of 60/16 MHz, and an X axis read counter with a clock of 60 MHz and thus the video signal is read out in accordance with the desired order. That is, X axis write counter 36A circulates eight times in the frequency of 15 MHz and Y axis address counter 35A writes eight image data on X axis and then is increased by '1' on the Y axis and thus circulates eight times in the frequency of 15/8 MHz, thereby assigning the write address of SRAM.

Also, X axis read counter 36B circulates eight times in the frequency of 60 MHz and Y axis read counter 35B circulates eight times in the frequency of 60/16 MHz, thereby repeatedly reading eight image data on the X axis twice per period. Since first and second phases, phase 1 and phase 2, are adjacent to third and fourth phases, phase 3 and phase 4, along the X axis as shown in FIG. 6A, the first line on first phase phase 1 is read and then the corresponding line on second phase phase 2 should be read so as to be in accord with the scanning order like that of FIG. 6D. Thus, the read address on the X axis is made to be provided for reading data twice on the X axis. The read and write addresses provided as stated above are switched by multiplexers 34A and 34B and then are outputted.

Also, video signals with a clock of 60 MHz provided from multiplexers 37A to 37D are matched for the order of FIG. 6D under the control of counter 39 through multiplexer 38 and then are sequentially provided to adder 12. This process is performed by multiplexer 38 for providing the inverse quantized and inverse discrete cosine transformed video signals on first to fourth phases phase 1 to phase 4 in accordance with the order of FIG. 6D by regarding the first and fourth output bits of counter 39 with a clock of 60/8 MHz as selection control inputs S0 and S1.

After the process for scanning compensation is completed, the video signal outputted to adder 12 according to the order of output from phase compensating section 13 is provided as the last expanded video signal which is motion compensated and is inverse quantized and inverse discrete cosine transformed as well.

Figure 8:
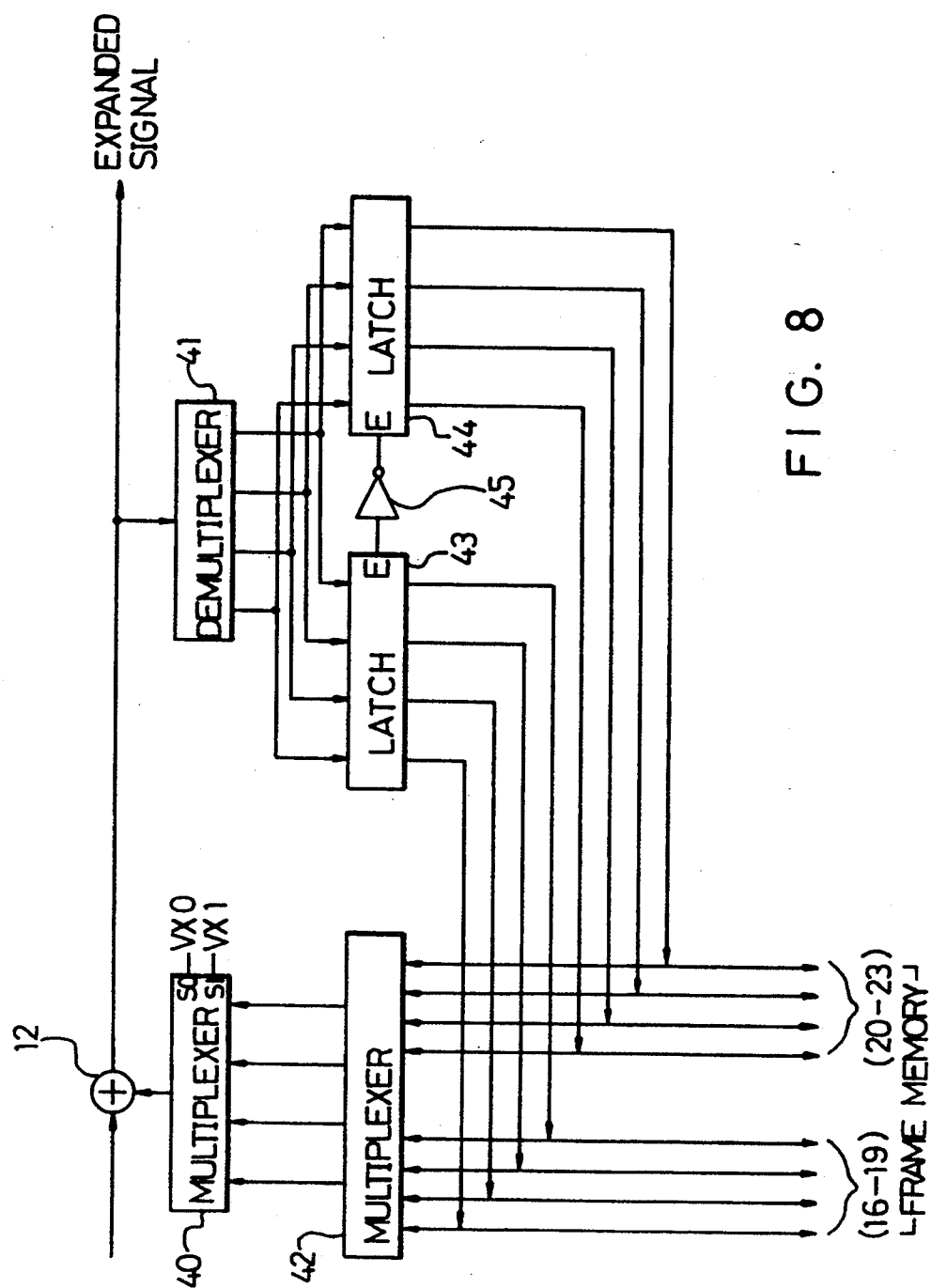
FIG. 8 shows an embodied circuit diagram of one embodiment of the phase compensating section, the phase dividing section, and the data switching section in the image decoder according to the present invention.

FIG. 8 shows the structures of phase compensating section 13, phase dividing section 14, and data switching section 15 of one embodiment according to the present invention. Phase compensating section 13 comprises a multiplexer 40 for providing the phase compensated video signal according to scanning order by regarding two lower bits of the motion vector corresponding to the X axis as control inputs. Phase dividing section 14 comprises a demultiplexer 41 for dividing the output of adder 12 into four phases which respectively match four pairs of frame memories. And, data switching section 15 comprises a multiplexer 42 for selecting the outputs of memories to be read of each pair of frame memories for each phase, tri-state latches 43 and 44 for selecting the input lines of memories to be written of each pair of frame memories for each phase, and an inverter 45 for converting the operations of latches 43 and 44.

In the read timing of frame memories 16 to 19, that is, write timing of frame memories 20 to 23, multiplexer 42 selects data lines of frame memories 16 to 19 and tri-state latch 43 becomes high impedance state and thus tri-state latch 44 becomes enable according to enable control signal E inverted by inverter 45. Accordingly, the video signals divided into four phases by demultiplexer 41 are written on frame memories 20 to 23 through tri-state latch 44 and simultaneously the video signals outputted from frame memories 16 to 19 are provided to multiplexer 40 through multiplexer 42. Thus, multiplexer 40 multiplexes the video signals from multiplexer 42 and then provides to adder 12 the multiplexed signal according to the order of FIG. 6D by regarding two lower bits VX0 and VX1 of motion vector corresponding to the X axis as control inputs S0 and S1.

Meanwhile, in the read timing of frame memories 20 to 23, that is, write timing of frame memories 16 to 19, multiplexer 42 selects data lines of frame memories 20 to 23 and tri-state latch 43 becomes enable and thus tri-state latch 44 becomes high impedance state according to enable control signal E inverted by inverter 45. Accordingly, the outputs of demultiplexer 41 are written on frame memories 16 to 19 through tri-state latch 43 and the video signals outputted from frame memories 20 to 23 are provided to adder 12 according to the order of FIG. 6D through multiplexers 42 and 40.

Figure 9:
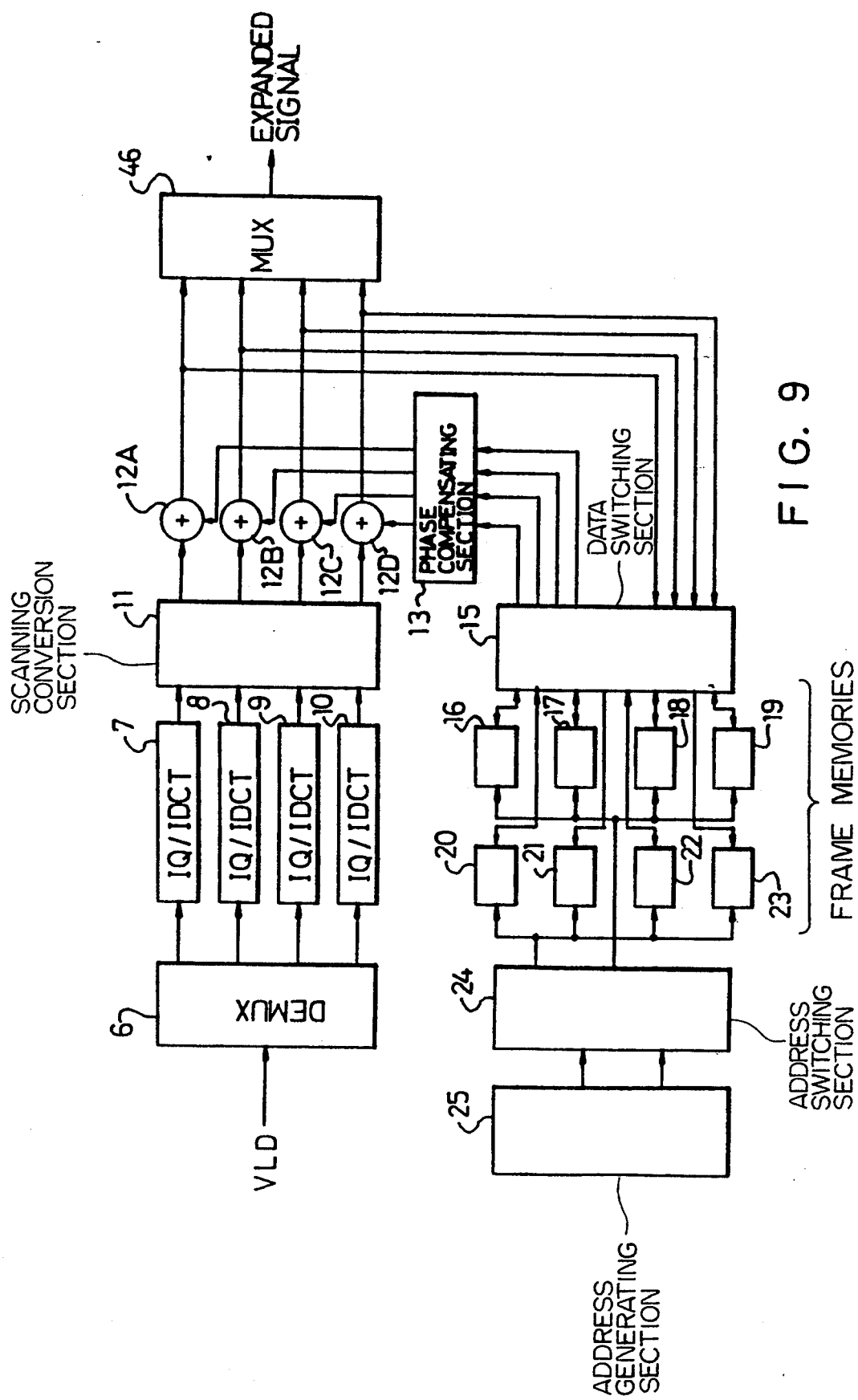

Meanwhile, with reference to FIG. 9 showing another embodiment of the present invention, the image decoder comprises a demultiplexer 6 for dividing a video signal for one frame into four phases of 8×8 block, inverse quantization and inverse discrete cosine transform sections 7 to 10 for respectively inverse quantizing and inverse discrete cosine transforming the divided video signals of 8×8 block, a scanning conversion section 11 for matching the scanning orders of the inverse quantized and inverse discrete cosine transformed video signals and the motion compensated video signals, adders 12A to 12D for respectively adding the scanning converted video signals to the motion compensated video signals for each phase, and a multiplexer 46 for multiplexing the video signals for one frame from adders 12A to 12D. The decoder also includes a phase compensating section 13 for matching respective phases of motion compensated video signals to be provided to adders 12A to 12D, a data switching section 15 for controlling the orders of reading and writing timings of the video signals to be provided to phase compensating section 13 and the video signals from adders 12A to 12D to be provided to multiplexer 46, frame memories 16 to 23 for alternately reading and writing the respective video signals for each phase, an address switching section 24 for controlling the orders of read and write addresses of frame memories 16 to 23 so as to be alternately provided, and an address generating section 25 for generating the read and write addresses of frame memories 16 to 23 through address switching section 24.

In another embodiment of the image decoder according to the present invention constructed as above, the sections having the same signs of one embodiment shown in FIG. 4 respectively perform the equal operations and thus explanations thereof are omitted.

In another embodiment, each video signal for each phase from scanning conversion section 11 and each motion compensated video signal for each phase from phase compensating section 13 are added by respective adders 12A to 12D. The respective added video signals for each phase are directly provided to data switching section 15 while, according to one embodiment of FIG. 4, the video signals pass through phase dividing section 14 and then are provided to data switching section 15. Multiplexer 46 multiplexes the last inverse quantized and inverse discrete cosine transformed video signals and the last motion compensated video signals for each phase and then provides the multiplexed signal.

Figure 10:
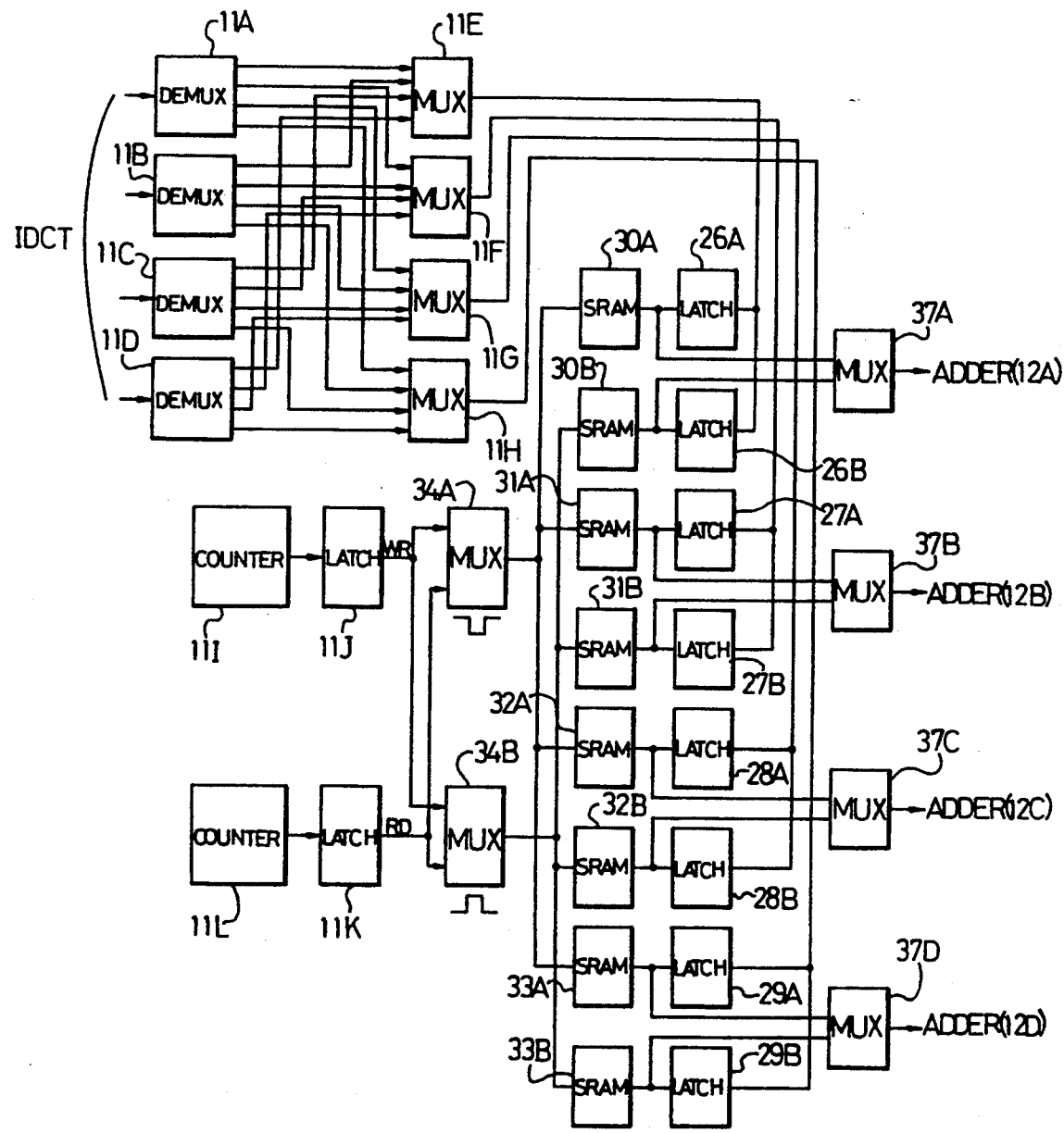
FIG. 10 is a block diagram of another embodiment of the image decoder according to the present invention.

Referring to FIG. 10 showing another embodiment of scanning conversion section 11 according to the present invention, the scanning conversion section comprises demultiplexers 11A to 11D and multiplexers 11E to 11H for dividing the video signals from inverse quantization and inverse discrete cosine transform sections 7 to 10 so as to be matched for the corresponding video signals from the motion compensating section for each phase, tri-state latches 26A to 29B for controlling the orders of reading and writing timings of the video signals provided from multiplexers 11E to 11H with a period of 16×16 block so as to be alternately provided, SRAMs 30A to 33B for alternately reading and writing the video signals of 8×8 block under the control of latches 26A to 29B, multiplexers 34A and 34B for alternately providing the read and write addresses of SRAMs 30A to 33B, a counter 11I for providing the write addresses of SRAMs 30A to 33B, a latch 11J for delay compensation, a PROM (Programmable Read Only Memory) 11K and a PROM address counter 11L for providing the read addresses of SRAMs 30A to 33B to multiplexers 34A and 34B in order to match the orders of the memorized video signal and the video signal provided from the motion compensating section, and multiplexers 37A to 37D for alternately switching the video signals provided from SRAMs 30A to 33B and providing the switched signals to adders 12A to 12D for each phase.

In another embodiment of the scanning conversion section according to the present invention constructed as above, the sections having the same signs of one embodiment shown in FIG. 7 respectively perform the equal operations and thus explanations thereof are omitted.

In another embodiment, the inverse discrete cosine transformed video signals like that of FIG. 6B are provided to 1:4 demultiplexers 11A to 11d for each phase. That is, first to fourth phases, phase 1 to phase 4, are respectively provided to 1:4 demultiplexers 11A to 11D.

Accordingly, the signals having passed through 1:4 demultiplexers 11A to 11D are divided in order to be in accord with the corresponding signals from motion compensating section for each phase (see FIG. 6D) and pass through 4:1 multiplexers 11E to 11H and then are provided as corresponding signals having the equal phases of video signals from the motion compensating section, that is, as signals corresponding to the phases divided in four on the X axis from 16×16 block. The signals are respectively provided to tri-state latches 26A to 29B.

The signals corresponding to the first phase provided from the inverse discrete cosine transform section with a period of 16×16 block as described above are matched for the signals on the first phase of the motion compensating section but the orders thereof do not correspond linearly. That is, because signals corresponding to the first phase from the inverse discrete cosine transform section enter tri-state latches 26A to 29B in accordance with the order of FIG. 6C, the video signals stored in SRAMs 30A to 33B as described above should be read according to the order of FIG. 6D in order to be in accord with the order of FIG. 6D.

The read addresses of SRAMs 30A to 33B are stored in PROM 11K and counter 11L provides the address of PROM 11K, thereby determining the order of reading timings of SRAMs 30A to 33B. The write addresses of SRAMs 30A to 33B are provided from counter 11I and latch 11J compensates for the delay time of counted value.

The address switching operation through multiplexers 34A and 34B and the data reading and writing operations of SRAMs through multiplexers 37A to 37D are equal to those of FIG. 7.

Figure 11:
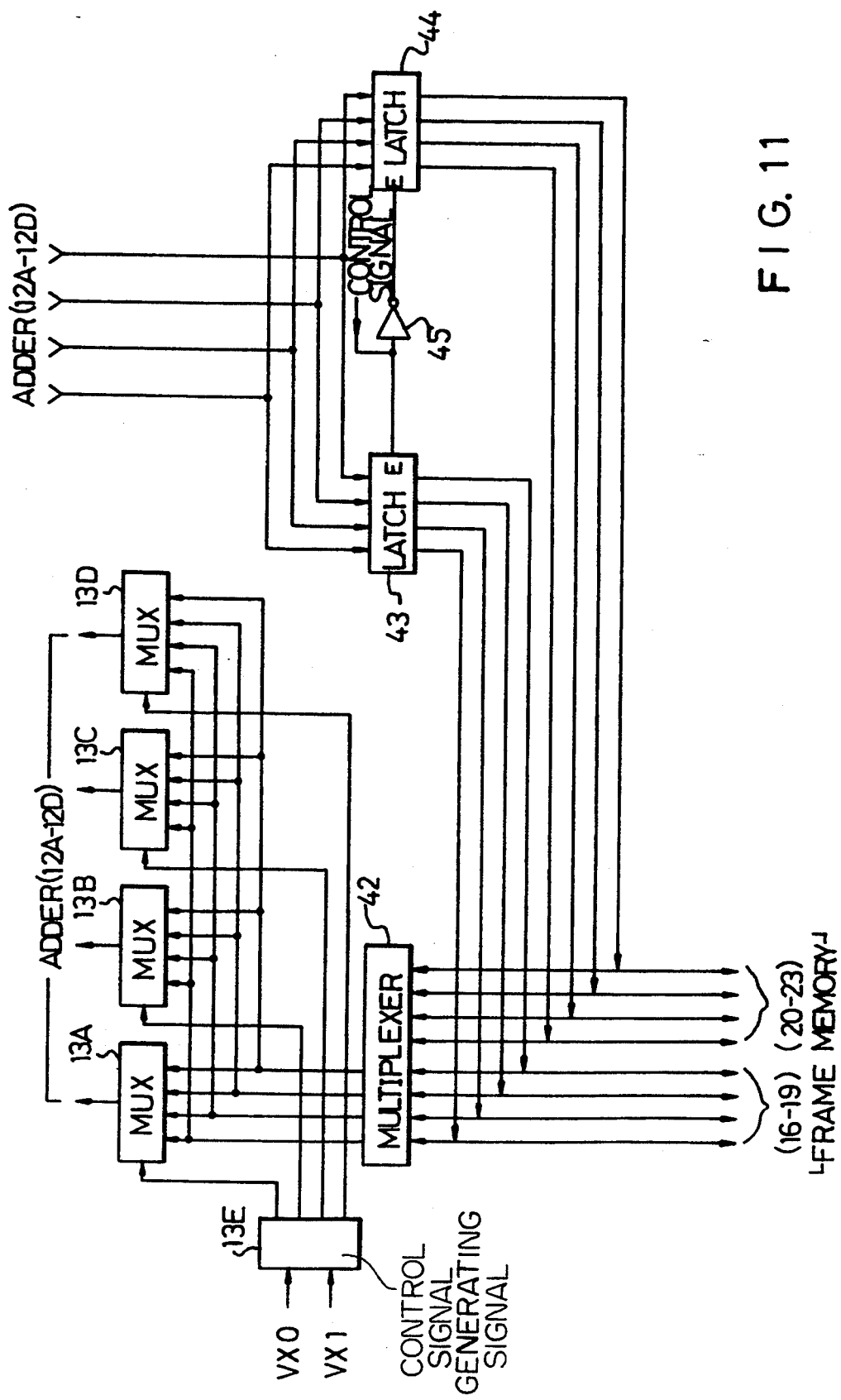
FIG. 11 shows an embodied circuit diagram of another embodiment of the phase compensating section and the data switching section in the image decoder according to the present invention.

FIG. 11 shows the structures of the phase compensating section and the data switching section of another embodiment according to the present invention.

Phase compensating section 13 comprises multiplexers 13A to 13D for providing the phase compensated video signals to adders 12A to 12D so as to be matched for the scanning order for each phase, and a control signal generating section 13E for controlling multiplexers 13A to 13D by regarding two lower bits VX0 and VX1 of motion vector corresponding to the X axis as input control signals.

Data switching section 15 comprises a multiplexer 42 for selecting the outputs of memories to be read of each pair of frame memories for each phase, tri-state latches 43 and 44 for selecting the input lines of memories to be written of each pair of frame memories for each phase, and an inverter 45 for converting the operations of latches 43 and 44.

In the read timing of frame memories 16 to 19, that is, write timing of frame memories 20 to 23, multiplexer 42 selects data lines of frame memories 16 to 19 and tri-state latch 43 becomes high impedance state and thus tri-state latch 44 becomes enable according to enable control signal E inverted by inverter 45. Accordingly, the video signals divided into four phases provided from adders 12A to 12D are written on frame memories 20 to 23 through tri-state latch 44 and simultaneously the video signals outputted from frame memories 16 to 19 are provided to multiplexers 13A to 13D through multiplexer 42. Thus, multiplexers 13A to 13D respectively multiplex the video signals from multiplexer 42 and then respectively provide to adder 12 the respective multiplexed video signals according to the order of FIG. 6D by regarding two lower bits VX0 and VX1 of motion vector corresponding to the X axis as control inputs S0 and S1 from control signal generating section 13E.

Meanwhile, in the read timing of frame memories 20 to 23, that is, write timing of frame memories 16 to 19, multiplexer 42 selects data lines of frame memories 20 to 23 and tri-state latch 43 becomes enable and thus tri-state latch 44 becomes high impedance state according to enable control signal E inverted by inverter 45. Accordingly, the outputs of adders 12A to 12D are written on frame memories 16 to 19 through tri-state latch 43 and simultaneously the video signals from frame memories 20 to 23 are provided to adders 12A to 12D according to the order of FIG. 6D through multiplexers 42 and 13A to 13D.

From the foregoing, it will be apparent that the present invention performs a process for inverse quantization and inverse discrete cosine transform and a process for motion compensation in parallel, thereby enabling stable real time processing of video signal with a low clock frequency. Moreover, according to the present invention, a problem in processing for motion compensation in the contour portion of subpictures can be overcome, thereby achieving high picture quality.

While the present invention has been described and illustrated herein with reference to the preferred embodiment thereof, it will be understood by those skilled in the art that various changes in form and details may be made therein without departing from the spirit and scope of the invention.

What is claimed is:

1. An image decoder comprising:
   a demultiplexer for dividing a video signal for a frame into four phases respectively comprising an 8×8 block;
   a plurality of inverse quantization and inverse discrete cosine transform means for respectively inverse quantizing and inverse discrete cosine transforming said divided video signals of the 8×8 block;
   phase compensating means for matching each of the phases of respective motion compensation video signals;
   scanning conversion means for matching respective scanning orders of said inverse quantized and inverse discrete cosine transformed video signals with the motion compensated video signal for each frame to generate a scanning converted video signal for each frame.;
   an adder for adding said scanning converted video signal for each frame to said motion compensated video signal of the corresponding frame;
   phase dividing means for dividing the video signal for a frame from said adder into four phases on the X axis;
   data switching means for controlling order of reading and writing timings of the video signals to be provided to said phase compensating means and the video signals output by said phase dividing means;

a plurality of pairs of frame memories for alternately reading and writing the respective phases of the video signals from said data switching means in each of the four phases;

address switching means for controlling order of read and write -addresses of said plurality of pairs of frame memories so as to alternate between the pairs of frame memories; and address generating means for generating said read and write addresses of said plurality of pairs of frame memories through said address switching means.

2. An image decoder as claimed in claim 1, wherein said scanning conversion means comprises:

a plurality of pairs of tri-state latches for controlling the order of reading and writing timings of the video signals from said plurality of inverse quantization and inverse discrete cosine transform means divided into four phases of 8×8 block in the unit of block;

a plurality of pairs of memories for alternately reading and writing the video signals under the control of respective tri-state latch among said plurality of pairs of tri-state latches;

a first pair of multiplexers for alternately providing the read and write addresses to said respective pairs of memories;

a first plurality of counters for providing the read and write addresses of said respective pairs of memories through said first pair of multiplexers;

a second plurality of multiplexers for respectively switching the video signals output from said plurality of pairs of memories in order to alternately provide the switched signals;

a third multiplexer for multiplexing the outputs of said second plurality of multiplexers according to the order of the phase compensated video signal; and a second counter for providing selection control signals of said third multiplexer.

3. An image decoder as claimed in claim 1, wherein said phase compensating means comprises a multiplexer for providing the video signal phase compensated by regarding two lower bits of a motion vector corresponding the X axis as control inputs so as to be matched for the scanning order.

4. An image decoder as claimed in claim 1, wherein said phase dividing means comprises a demultiplexer for dividing the output signal of said adder into four phases so as to be respectively matched for each of said plurality of pairs of frame memories.

5. An image decoder as claimed in claim 1, wherein said data switching means comprises:

a multiplexer for selecting the respective outputs of frame memories to be read among said respective pairs of frame memories for each phase;

a pair of tri-state latches for selecting the respective input lines of frame memories to be written among said respective pairs of frame memories for each phase; and an inverter for inverting the operations of said pair of tri-state latches.

6. An image decoder comprising:

a demultiplexer for dividing a video signal for a frame into four phases respectively comprising an 8×8 block;

a plurality of inverse quantization and inverse discrete cosine transform means for respectively inverse quantizing and inverse discrete cosine transforming said divided video signals of the 8×8 block;

phase compensating means for matching each of the phases of respective motion compensation video signals;

scanning conversion means for matching respective scanning orders of said inverse quantized and inverse discrete cosine transformed video signals with said motion compensated video signal for each frame to generate a scanning converted video signal for each frame;

a plurality of adders for respectively adding said scanning converted video signals to said motion compensated video signals for each phase;

a multiplexer for multiplexing the video signals output from said plurality of adders in the unit of frame;

data switching means for controlling the order of reading and writing timings of the video signals to be provided to said phase compensating means and the video signals output said plurality of adders to be provided to said multiplexer;

a plurality of pairs of frame memories for alternately reading and writing the video signals from said data switching means in each of the four phases;

address switching means for controlling the order of the read and write addresses of said plurality of pairs of frame memories so as to alternate between the pairs of frame memories; and address generating means for generating said read and write addresses of said plurality of pairs of frame memories through said address switching means.

7. An image decoder as claimed in claim 6, wherein said scanning conversion means comprises:

a first plurality of demultiplexers and a second plurality of multiplexers for dividing the video signals output from said plurality of inverse quantization and inverse discrete cosine transform sections so as to be matched for the corresponding video signals output from said phase compensating means for each phase;

a plurality of pairs of tri-state latches for controlling the video signals output from said second plurality of multiplexers so as to be alternately read and written with a period of a 16×16 block;

a plurality of pairs of memories for alternately reading and writing the video signals under the control of respective tri-state latch among said plurality of pairs of tri-state latches;

a third pair of multiplexers for alternately providing the read and write addresses to said respective pairs of memories;

a counter for providing the read and write addresses of said respective pairs of memories;

a latch for delay compensation;

a programmable read only memory (PROM) and a PROM address counter for providing the read addresses of said respective pairs of memories to said third pair of multiplexers in order to match the orders of a memorized video signal and the video signal output from said phase compensating means; and a fourth plurality of multiplexers for alternately switching the video signals outputted from said respective pairs of memories so as to respectively provide the switched signals to said plurality of adders for each phase.

8. An image decoder as claimed in claim 6, wherein said phase compensating means comprises:
a plurality of multiplexers for respectively providing the phase compensated video signals to said plurality of adders so as to be matched for the scanning order for each phase; and
control signal generating means for controlling said plurality of multiplexers by regarding two lower bits of a motion vector corresponding to X axis as input control signals.

9. An image decoder as claimed in claim 6, wherein said data switching means comprises:
a multiplexer for selecting the respective outputs of frame memories to be read among said respective pairs of frame memories for each phase;
a pair of tri-state latches for selecting the respective input lines of frame memories to be written among said respective pairs of frame memories for each phase; and
an inverter for inverting the operations of said pair of tri-state latches.

* * * * *